United States Patent [19]
Kelemen et al.

[11] Patent Number: 6,081,992
[45] Date of Patent: Jul. 4, 2000

[54] ELECTROCHEMICAL CELL FORMED WITH BIG MOUTH OPEN END CAN

[75] Inventors: Marc P. Kelemen, Westlake; Susan L. Svec, Olmsted Township, both of Ohio

[73] Assignee: Eveready Battery Company, Inc., St. Louis, Mo.

[21] Appl. No.: 09/109,754

[22] Filed: Jul. 2, 1998

[51] Int. Cl.[7] ............... H01M 2/00; H01M 2/04; H01M 6/00
[52] U.S. Cl. ............ 29/623.1; 29/623.2; 429/163; 429/176
[58] Field of Search ............ 429/176, 163; 29/623.1, 623.2

[56] References Cited

U.S. PATENT DOCUMENTS

| | | |
|---|---|---|
| 380,855 | 4/1888 | Brewer . |
| 432,973 | 7/1890 | Brewer . |
| 494,852 | 4/1893 | Fitch . |
| 520,033 | 5/1894 | Burnham . |
| 3,069,489 | 12/1962 | Carmichael et al. . |
| 3,554,813 | 1/1971 | Feldhake . |
| 4,959,280 | 9/1990 | Amthor . |
| 5,422,201 | 6/1995 | Georgopoulos . |
| 5,489,493 | 2/1996 | Urry ............................ 429/224 |
| 5,490,867 | 2/1996 | Kozawa et al. ............. 29/623.2 |
| 5,855,627 | 1/1999 | Huhndorff et al. .......... 29/623.2 |

FOREIGN PATENT DOCUMENTS

| | | | |
|---|---|---|---|
| 0 097 356 A1 | 1/1984 | European Pat. Off. ......... H01M 2/04 |
| 63-221552 | 9/1988 | Japan ................... H01M 2/02 |
| 92/04738 | 3/1992 | WIPO ................... H01M 2/02 |

OTHER PUBLICATIONS

George Wood Vinal, Sc.D., "Primary Batteries", New York, John Wiley & Sons, Inc. and London, Chapman & Hall, Limited, 1951, pp. 20–21. [No Month].

*Primary Examiner*—Maria Nuzzolillo
*Assistant Examiner*—Tracy Dove
*Attorney, Agent, or Firm*—Russell H. Toye, Jr.; Robert W. Welsh

[57] ABSTRACT

Assembly of an electrochemical cell using a prismatic steel can having an enlarged circular opening at one end. The active materials of this cell including the cathode are disposed into the prismatic can through the circular opening, and the circular opening is subsequently reduced in size to a round reduced size opening. A round cover and seal assembly closes the opening of the cell.

31 Claims, 3 Drawing Sheets

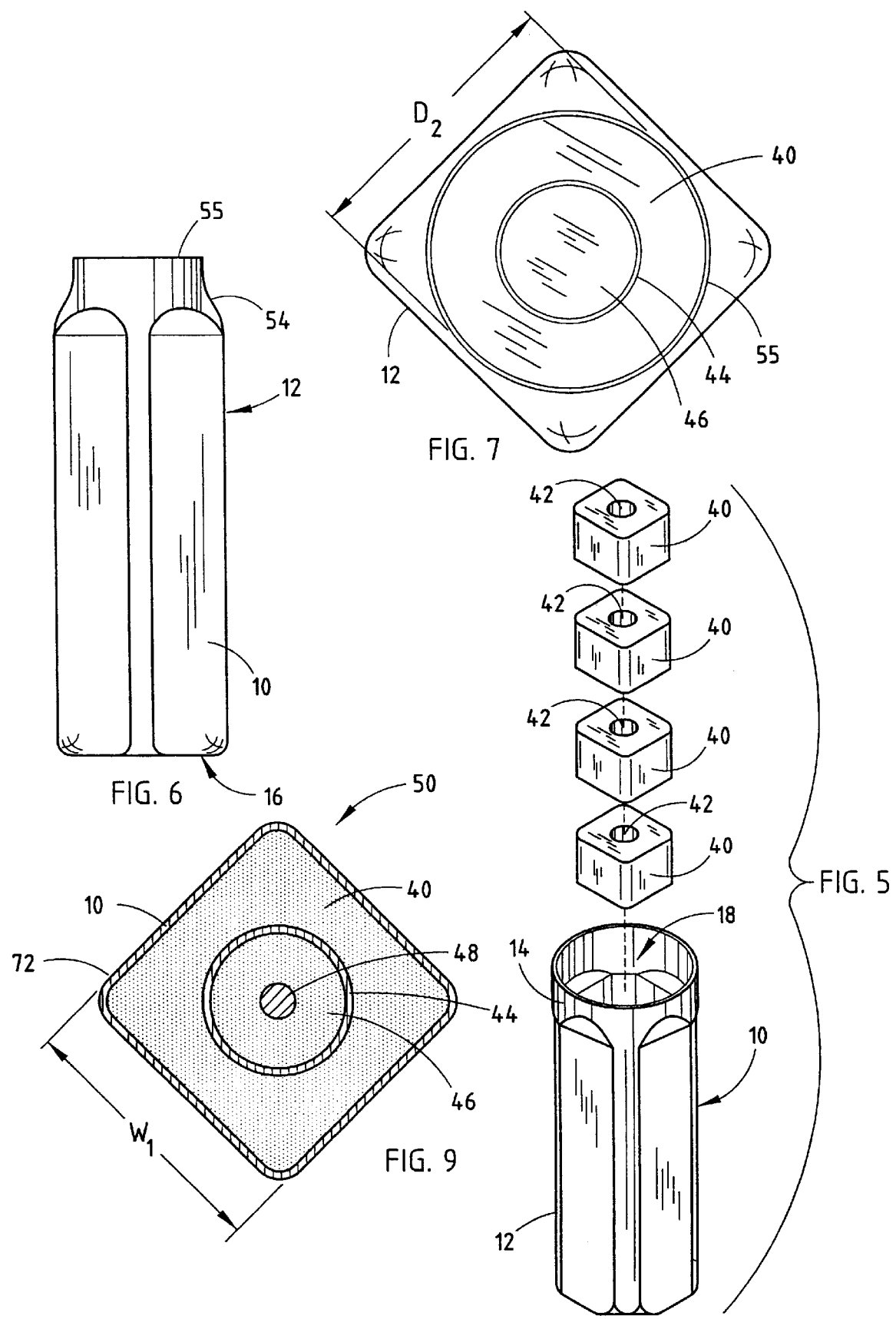

ELECTROCHEMICAL CELL FORMED WITH BIG MOUTH OPEN END CAN

BACKGROUND OF THE INVENTION

The present invention generally relates to electrochemical cells and, more particularly, to a method of assembling an electrochemical cell having a non-cylindrical container.

Conventional alkaline cells commonly employ a cylindrical shaped steel can provided with a positive cover at one end and a negative cover at the opposite end. The cylindrical steel can houses a positive electrode, referred to as the cathode, which is preferably formed of a mixture of manganese dioxide, graphite, potassium hydroxide solution, deionized water, and other additives, and the cathode is commonly formed about the interior side surface of the cylindrical steel can. A cup-shaped separator is commonly disposed about the interior surface of the cathode. A negative electrode, referred to as the anode, which is typically formed of zinc powder, a gelling agent, and other additives, is dispensed within the separator along with electrolyte solution.

Conventional cylindrical cells are widely available in sizes AAAA, AAA, AA, C, and D for use as the power source for various electrically operated devices. Despite the popularity of the conventional cylindrical cells, it has been discovered that there is a potential need to provide for non-cylindrical cell configurations. One such potential need exists for use in a multiple-cell battery, such as the 9-volt battery, which commonly houses six 1.5 volt cells electrically connected in series. In the past, multiple cylindrical cells have been assembled together in a rectangular container, thereby resulting in unused space between adjacent cells as well as between each cell and the inside walls of the battery container. In addition, it has also been discovered that many battery operated electrical devices are capable of using noncylindrical cells which may allow for increased service performance. An example of a noncylindrical cell is disclosed in co-pending U.S. application Ser. No. 09/110,119, pending entitled "Electrochemical Cell and Battery" filed on Jul. 2, 1998, to Lewis Urry, which is hereby incorporated by reference.

A primary goal in designing alkaline batteries is to increase the service performance of the cell. Another goal is to achieve high quality cell assembly techniques. The service performance is the length of time for the cell to discharge under a given load to a specific voltage at which the cell is no longer useful for its intended purpose. Commercially available alkaline cells and batteries have an external size that is commonly defined by industry standards, thereby limiting the ability to increase the amount of active materials within a given cell and to confine the volume that is available. Accordingly, the need to find new ways to increase service performance and provide suitable assembly techniques remains a primary goal of the cell designer.

SUMMARY OF THE INVENTION

The present invention improves the assembly of a cell having a non-cylindrical prismatic can, such as a rectangularly configured can, by providing the can with an enlarged open end to accommodate assembly of active materials into the cell, and reducing the enlarged open end to a reduced size round open end that may advantageously be fit with a compact round cover. To achieve this and other advantages, and in accordance with the purpose of the invention as embodied and described herein, the present invention provides a method of assembling an electrochemical cell comprising the steps of providing a can having a prismatic section with a closed bottom end and a big mouth round open top end. The big mouth round open top end has a diameter that is at least as wide as the maximum inside cross-sectional width of the prismatic section. The method includes the step of disposing a cathode into the prismatic section through the big mouth open top end. The cathode is configured with a cavity formed therein and is disposed in the can such that the cathode consumes a substantial volume of the prismatic section between the cavity and inner walls of the can. The method further includes the steps of disposing a separator within the cavity and further disposing an anode within the separator in the cavity. According to the method, the size of the big mouth open top end is reduced in size to provide a reduced diameter open top end upon which a round cover is assembled. The big mouth open top end of the can advantageously allows for assembly of the cathode, particularly for ring molding assembly, and reduction of the big mouth open top end subsequent to insertion of the cathode allows for a reduced size round top cover to be assembled thereto.

These and other features, objects, and benefits of the invention will be recognized by those who practice the invention and by those skilled in the art, from reading the following specification and claims, together with reference to the accompanying drawings.

BRIEF DESCRIPTION OF THE DRAWINGS

In the drawings:

FIG. 5 is an exploded view of a partially assembled cell illustrating ring molded cathode assembly;

FIG. 6 is a perspective view of a partially assembled cell illustrating the prismatic can having a reduced size round open end according to the assembly method of the present invention;

FIG. 7 is a top end view of the partially assembled cell of FIG. 6 further illustrating the reduced size round open end of the can;

FIG. 9 is a radial cross-sectional view of the fully assembled cell taken through lines IX—IX of FIG. 8.

DETAILED DESCRIPTION OF THE PREFERRED EMBODIMENTS

Figure 1:
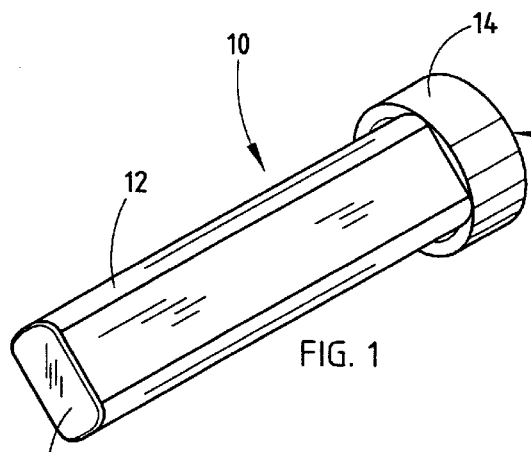
FIG. 1 is a perspective view of a prismatic steel can having a cylindrical section with a big mouth open end for use in the cell assembly of the present invention.
Figure 2:
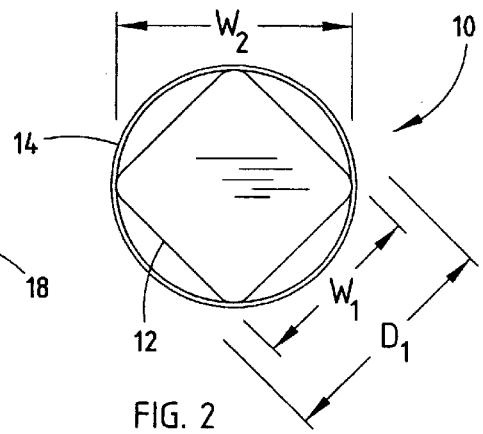
FIG. 2 is a top end view of the prismatic can of FIG. 1.

Referring to FIGS. 1 and 2, a prismatic steel can 10 is shown having an enlarged open end, which is referred to herein as the big mouth open end 18, for use in the assembly of an electrochemical cell according to the present invention. Steel can 10 includes a non-cylindrical prismatic section 12, shown configured as a rectangular section, having a closed bottom end 16. Opposite the bottom end 16, steel can 10 has a cylindrical section 14 that transitions from the prismatic section 12 to the big mouth open top end 18. The prismatic section 12 of cell 10 is provided with four substantially planar and rectangularly-shaped sidewalls that may be configured with rounded adjoining edges to provide a substantially rectangular radial cross section with rounded corners.

With particular reference to FIG. 2, the cylindrical section 14 of can 10 provides for an enlarged opening that leads into the interior of prismatic section 12. Cylindrical section 14 provides the big mouth round opening 18 having a diameter $D_1$ that is greater than the cross-sectional width $W_1$ between opposite walls of the prismatic section 12. Moreover, it is preferred that the big mouth diameter $D_1$ of cylindrical section 14 be equal to or greater than the largest cross-sectional width $W_2$ of the interior of prismatic section 12 so that cell materials can be easily assembled into steel can 10 and will not be impeded by the configuration of cylindrical section 14.

Figure 3:
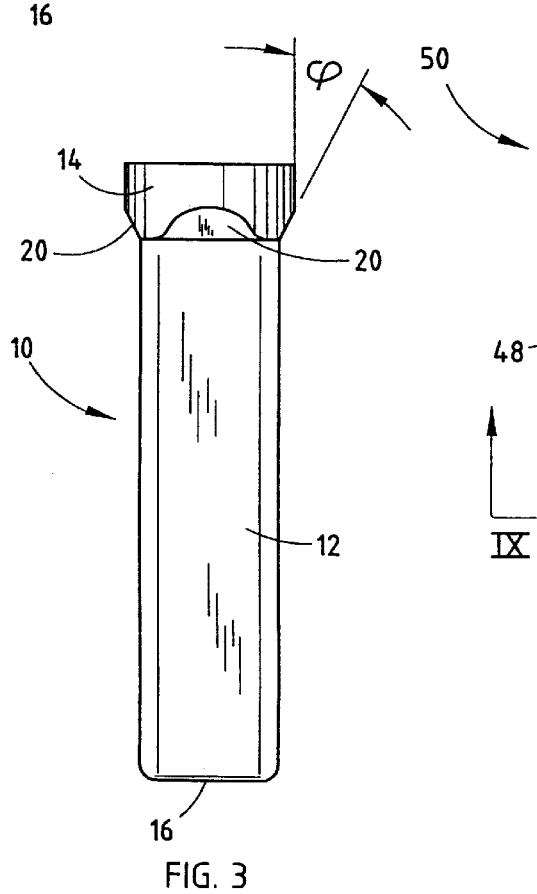
FIG. 3 is a perspective view of a prismatic steel can with the big mouth open end and further including a tapered transition according to another embodiment.

The steel can 10 may be configured according to another embodiment as shown in FIG. 3. According to this other embodiment, steel can 10 further includes the addition of flat tapered transitions 20 that transition at a sloped angle θ from each of the planar sidewalls of prismatic section 12 to the cylindrical section 14. Each of the tapered transitions 20 is provided at a sloped angle θ greater than zero degrees and up to ninety degrees. The tapered transition 20 provides a lead in for closing to aide in a smooth reduction in size of the cylindrical section 14. In addition, tapered transition 20 allows for enhanced handling and use in roller feeders and other assembly equipment present in the cell production assembly.

Figure 4:
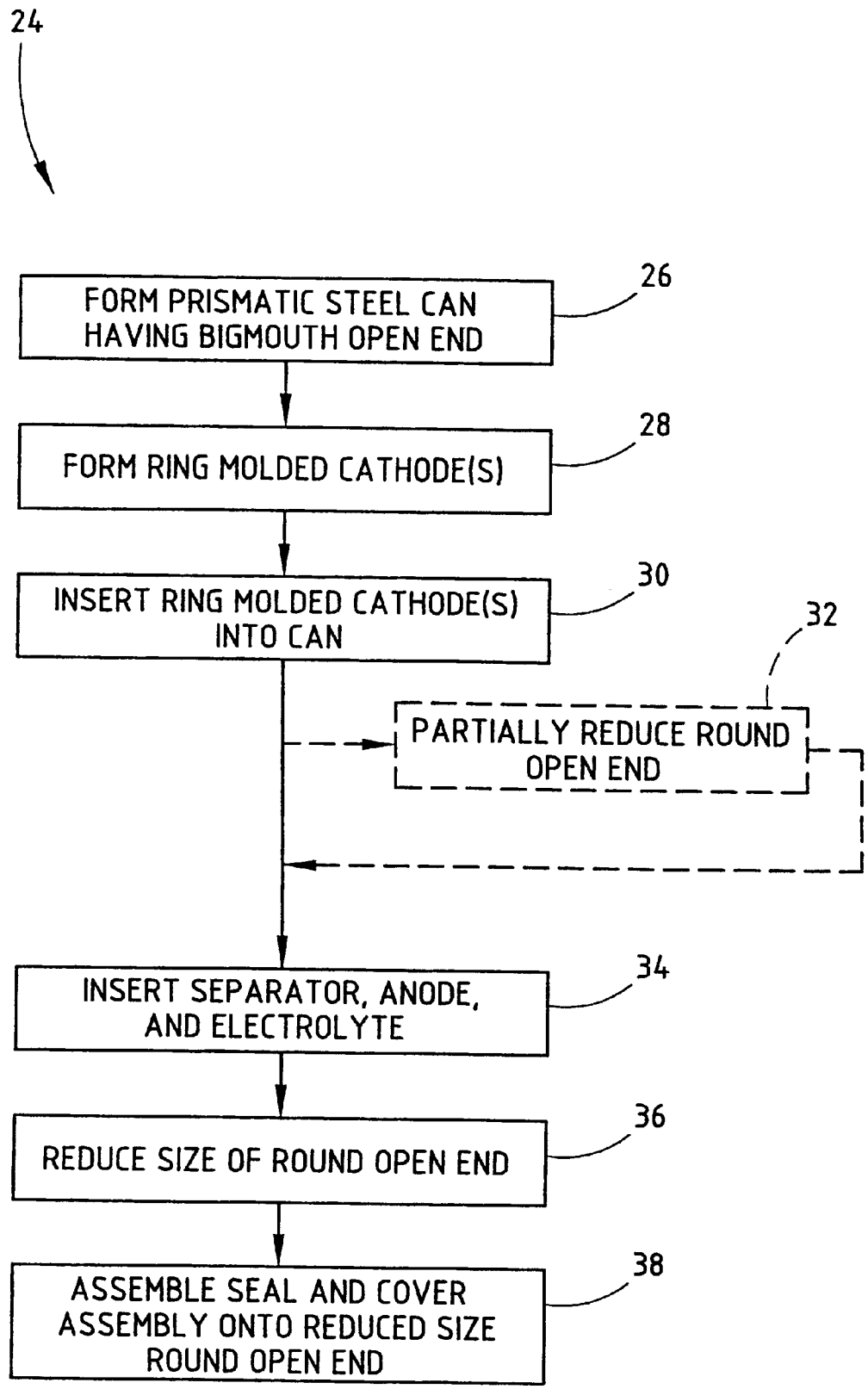
FIG. 4 is a flow diagram illustrating the method of assembly of an electrochemical cell according to the present invention.

The prismatic steel can 10 with enlarged big mouth opening 18 is employed in accordance with a method of assembling an electrochemical cell according to the present invention. Referring to FIG. 4, the cell assembly method 24 is illustrated therein. The cell assembly method 24 begins with the step 26 of forming a prismatic steel can 10 having a big mouth open end 18 as described above in connection with FIGS. 1–3. Steel can 10 can be formed with the prismatic section 12 and the cylindrical section 14 by deep drawing can formation techniques, stamping, hydroforming, or other various steel can manufacturing techniques. The method of assembly of the present invention requires that the steel can 10 have a prismatic section 12 that is non-cylindrical and an enlarged big mouth round opening 18 having a diameter $D_1$ that is equal to or greater than the maximum inside cross-sectional width $W_2$ of the prismatic section 12 to allow for easy assembly of the cell's internal materials. This is particularly useful for allowing ring molded cathode insertion techniques, in which the positive electrode, referred to as the cathode, is dispensed in the can in a preformed ring configuration.

For a ring molded cathode cell assembly, cell assembly method 24 provides the step 28 of forming one or more ring molded cathodes. The process of forming ring molded cathodes generally includes adding a measured charge of cathode mix to a ring shaped die set and, with the use of a die press, molding the cathode mix into the shape of a ring. The process of forming ring molded cathodes is widely known in the art. However, the molded cathode rings of the present invention are preferably configured to substantially conform to the shape and size of the inside of the prismatic section 12, and have a cylindrical cavity extending centrally therethrough.

Next, step 30 provides for the insertion of one or more ring molded cathodes into the steel can 10. This may be accomplished by loading a fixed number of one or more cathode rings onto a mandril, which is then lowered into the can 10 and the cathode rings are pressed into the can by way of an upper punch. The number of cathode rings inserted into a particular cell may vary depending on the size of the cell. For cells having a length and width comparable to AAA and AAAA size alkaline cells, three or four cathode molded rings may be adequate to form the cathode for each cell.

Referring briefly to FIG. 5, the step 30 of inserting ring molded cathodes into the can 10 is illustrated therein. Each of the molded cathode rings 40 has a rectangular configuration that substantially conforms to the size and shape as defined by the interior walls of the prismatic section 12. The cathode rings 40 are inserted and stacked one on top of the other within the prismatic section 12, preferably in a snug-fit relationship such that each of the cathode rings abuts each of the surrounding walls on the inside of can 10. The outer walls defining the perimeter of each of the cathode rings may further be impregnated with carbon. In addition, each of the cathode rings includes a cylindrical opening 42 extending therethrough. When assembled in the can 10, the cylindrical openings 42 align to define the anode cavity into which the separator and anode are disposed.

Returning to the assembly method 24 of FIG. 4, subsequent to insertion of the ring molded cathode into the prismatic section of can 10, an inner cylindrical cavity extends through the central longitudinal axis of can 10 and the cathode substantially consumes the remaining volume of the prismatic section 12. According to step 34, a cup-shaped separator is disposed within the inner cylindrical cavity. Disposed inside the cup-shaped separator is the negative electrode, referred to as the anode, which may include a gelled anode. An electrolyte solution is further disposed within can 10.

Once the above-identified cell materials have been disposed within can 10, cell assembly method 24 provides the step 36 of reducing the size of the big mouth open end 18 by reducing the size of cylindrical section 14. The partially assembled can 10 with reduced size round open end is shown in FIGS. 6 and 7 following assembly step 36, but prior to full assembly. The big mouth open end 18 is preferably reduced in size to a round open end 55 having a diameter $D_2$ that is less than or equal to the minimum cross-sectional width $W_1$ of the prismatic section 12 of can 10. The reduced size open end 55 is achieved by squeezing the cylindrical section 14 radially inward. This preferably forms a bottleneck 54 that transitions from the prismatic section 12 to the reduced size round open end 55.

It is preferred that the big mouth open end reduction not exceed a maximum diameter reduction of thirty percent (30%) by diameter (linear) reduction or seventy percent (70%) by cross-sectional area. In addition, the reduced round top end may include a substantially cylindrical section leading to a round open end. The cylindrical section is preferably short in length and the round cover sealingly engages to the open round end.

The reduction of big mouth opening 18 of diameter $D_1$ to reduced size open end 55 of diameter $D_2$ may be achieved by any one of a number of can closure techniques which include but are not limited to impact closing, beaded closing, rotary swaging, and roller closing. One such technique for closing the opening on an electrochemical cell is disclosed in U.S. Pat. No. 3,069,489, entitled "Container Closure," which is hereby incorporated by reference.

Referring again to FIG. 4, assembly method 24 further includes step 38 in which a collector is assembled in contact with the anode, and a seal and cover assembly is assembled to the reduced size round open top end 55. This step 38 closes and seals the can 10. Accordingly, the use of a can containing a big mouth open end 18 allows for easy insertion of cell materials, and by reducing the open end in size to a reduced size round open end allows for a round cover and seal assembly of the conventional type to close and seal the can. Reduction of the open end advantageously enables a plurality of cells to interface with each other without interference.

According to another embodiment, the assembly method 24 of the electrochemical cell may further include the step 32 of partially reducing the round big mouth open end, following the step 30 of inserting the ring molded cathodes into the can. This intermediate reduction step 32 provides a partially reduced round open end, through which the separator, anode, and electrolyte are subsequently inserted pursuant to step 34. According to this approach, step 36 completes the reduction in the size of the round open end to its fully reduced dimension, and the seal and cover assembly is then assembled thereto.

Figure 8:
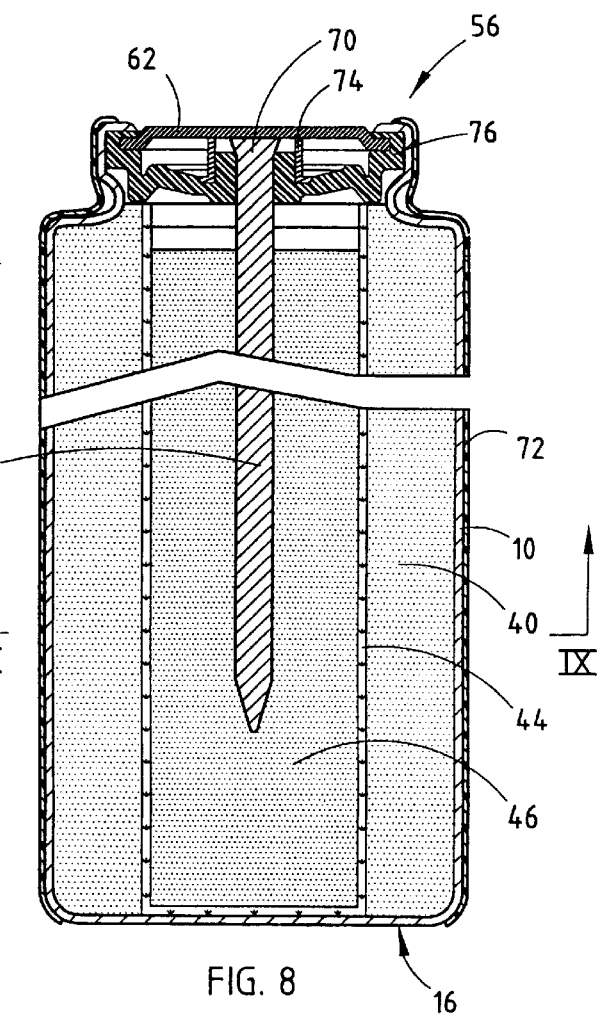
FIG. 8 is a cross-sectional view of the fully assembled cell taken through its longitudinal axis.

Referring to FIGS. 8 and 9, a fully assembled electrochemical cell 50 assembled according to assembly method 24 of the present invention is shown therein. The active cell materials are shown disposed substantially within the prismatic section 12 of can 10. A round cover and seal assembly 56 is assembled to the reduced size open end of can 10. With adequate reduction in size of the open end, the round cover and seal assembly 56 is equal to or less than the cross-sectional width $W_1$ of the prismatic section 12. Accordingly, the round cover and seal assembly 56 preferably does not extend radially beyond any of the sidewalls defining the prismatic section 12. The round cover and seal assembly 56 can be easily welded, attached by adhesive or otherwise assembled to the reduced size round top end.

The cover and seal assembly 56 with outer negative cover 62 is shown assembled to the top end of the cell 50. A thin layer of shrink tube insulation 72 covers the sides of steel can 10 to electrically insulate the metal casing of the cell. The cathode 40, preferably formed of a mixture of manganese dioxide, graphite, potassium hydroxide solution, deionized water, and other additives, is disposed between the separator 44 and inner walls of can 10 substantially throughout the prismatic section 12. The cup-shaped separator 44 is preferably formed of a nonwoven fabric that prevents migration of any solid particles in the cell. As shown, the active materials of cell 50, including the anode 46 and cathode 40, are substantially disposed within the prismatic section 12.

Cover and seal assembly 56 provides the closure to the assembly of cell 50 and includes a seal body 76 and compression member 74. The seal body 76 is generally shaped like a disk and made from electrically non-conductive material. The compression member 74 is a tubular-shaped metallic component that compresses the seal body 76 around the current collector 70. The seal assembly 56 also includes an outer negative cover 62 welded to the exposed end of the current collector 70 to form the cell's negative terminal. The rim of steel can 10 is crimped inwardly toward the cell body to form a seal. The seal assembly 56 with cover 62 may include conventional round assembly, such as that disclosed in U.S. Pat. No. 5,422,201, which is hereby incorporated by reference.

The bottom end 16 of cell 50 serves as a positive cover to provide a positive cell terminal. The cover and seal assembly 56 includes a negative cell cover terminal 62. When using a prismatic can 10, cell 50 realizes an increased volume in the prismatic section 12 in contrast to the conventional cylindrical cell of a diameter equal to cell wall width $W_1$, while having a round top end 55 that easily accommodates a standard round negative cover and seal assembly 56. This allows for an increase in active cell materials over that of the conventional cylindrical cell of a size having a diameter equal to the width of the sidewalls of the prismatic section 12.

It should be appreciated that the negative electrode, referred to as the anode 46, is preferably disposed in the inner cylindrical volume of the prismatic section 12 of can 10, while the positive electrode, referred to as the cathode 40, fills the volume between the separator 44 and the interior walls of the steel can 10, including all the corners of the can 10. By providing a rectangular configuration, the volume within the prismatic section 12 of cell 50 is larger than that of a conventional cylindrical cell having dimensions that would fit within the rectangular walls of cell 50. This allows for an increase in the volume of the cathode 40 as well as the anode 46. In addition, the cup-shaped separator 44 may be further disposed radially outwardly from the longitudinal axis of cell 50 so as to provide a greater anode-to-cathode interface surface areas separating the anode 46 and cathode 40 from each other. It should be appreciated that the additional active materials, including those disposed in the corners of the cathode 40, discharge to increase the capacity of the cell 50.

It should be appreciated that the cell 50 of the present invention advantageously employs a can 10 having a non-cylindrical prismatic section 12 with a large big mouth opening 18 at one end for receiving active materials of the cell, and is particularly well suited for a ring molded cathode assembly. However, it should also be appreciated that the assembly method of the present invention is likewise applicable to other cathode assembly techniques such as impact molding. In addition, the teachings of the present invention are not limited to bobbin type cells, as such teachings may be applicable to other cell assemblies such as the jelly roll configuration or stacked plate cell assemblies, among other possible cell assemblies.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

What is claimed is:

1. A method of assembling an electrochemical cell comprising the steps of:
   providing a can having a prismatic section with a closed bottom end and an open top end that is circular with a diameter equal to or greater than the maximum inside cross-sectional width of said prismatic section;
   disposing a cathode through said open top end and into said prismatic section, said cathode having a cavity centrally formed therein and disposed so that said cathode consumes a substantial volume of said prismatic section between said cavity and inner walls of said can;
   disposing a separator within said cavity;
   disposing an anode within said separator in said cavity;
   reducing the size of said open top end of said can to provide a reduced size round open top end; and
   assembling a cover to said reduced size round open top end.

2. The method as defined in claim 1 further comprising the step of forming said can to include a cylindrical section that provides said open top end.

3. The method as defined in claim 2 further comprising the step of forming a tapered transition between said prismatic section and said cylindrical section.

4. The method as defined in claim 1, wherein said step of reducing said open top end includes reducing said open top end such that the diameter of said reduced open top end is less than or equal to the minimum cross-sectional width of said prismatic section.

5. The method as defined in claim 4, wherein said step of reducing said open top end includes the step of rotary swaging.

6. The method as defined in claim 1, wherein said step of providing a can includes forming said prismatic section as a substantially rectangular section.

7. The method as defined in claim 1, wherein said step of disposing said cathode into said can comprises a cathode ring molding process.

8. The method as defined in claim 7, wherein said cathode ring molding process includes the step of inserting multiple cathode rings stacked one on top of another.

9. The method as defined in claim 1, further comprising the step of dispensing a current collector in contact with said anode.

10. The method as defined in claim 1 wherein said can is a steel can.

11. A method of assembling an electrochemical cell comprising the steps of:
providing a can having a non-cylindrical section with a closed bottom end and an open top end that is circular with a diameter equal to or greater than the maximum inside cross-sectional width of said non-cylindrical section;
disposing a first electrode through said open top end and into said noncylindrical section, said first electrode having a cavity centrally formed therein and disposed so that said first electrode consumes a substantial volume of said non-cylindrical section between said cavity and inner walls of said can;
disposing a separator within said cavity;
disposing a second electrode within said separator in said cavity;
reducing the size of said open top end of said can to provide a reduced size round open top end; and
assembling a cover to said reduced size round open top end.

12. The method as defined in claim 11 further comprising the step of forming said can to include a cylindrical section that provides said open top end.

13. The method as defined in claim 12 further comprising the step of forming a tapered transition between said non-cylindrical section and said cylindrical section.

14. The method as defined in claim 11, wherein said step of reducing said open top end includes reducing said open top end such that the diameter of said reduced open top end is less than or equal to the minimum cross-sectional width of said noncylindrical section.

15. The method as defined in claim 11, wherein said step of disposing said first electrode into said can comprises a ring molding process.

16. The method as defined in claim 15, wherein said ring molding process includes the step of disposing multiple first electrode rings in said non-cylindrical section and stacked one on top of another.

17. The method as defined in claim 11 further comprising the step of forming said non-cylindrical section as a prismatic section.

18. The method as defined in claim 17 further comprising the step of forming said prismatic section to include a rectangular cross section.

19. A ring molding method of assembling an electrochemical cell comprising the steps of:
providing a can having a prismatic section with a closed bottom end and an open top end that is circular with a diameter equal to or greater than the maximum inside cross-sectional width of said prismatic section;
forming one or more molded cathode rings, each of said cathode rings configured to fit inside said prismatic section of said can and further having a cavity formed therein;
disposing said one or more cathode rings through said open top end and into said prismatic section such that said one or more cathode rings consumes a substantial volume of said prismatic section between said cavity and inner walls of said can;
disposing a separator within said cavity;
disposing an anode within said separator in said cavity;
reducing the size of said open top end of said can to provide a reduced size round open top end; and
assembling a cover to said reduced size round open top end.

20. The method as defined in claim 19, wherein said step of disposing said one or more cathode rings includes disposing multiple cathode rings into said prismatic section stacked one on top of another.

21. The method as defined in claim 19, wherein said step of reducing said open top end includes reducing said open top end such that the diameter of said reduced open top end is less than or equal to the minimum cross-sectional width of said prismatic section.

22. A method of assembling an electrochemical cell comprising the steps of:
providing a can having a prismatic section with a closed bottom end and an open top end that is circular with a diameter equal to or greater than the maximum inside cross-sectional width of said prismatic section;
disposing a cathode into said prismatic section;
disposing an anode into said prismatic section;
disposing a separator between said anode and cathode;
reducing the size of said open top end of said can to provide a reduced size round open top end; and
assembling a cover to said reduced size round open top end.

23. The method as defined in claim 22, wherein said steps of disposing said anode and cathode includes disposing said anode and cathode within said prismatic section such that said prismatic section is substantially consumed with said anode and cathode.

24. The method as defined in claim 22, further comprising the step of forming said can to include a cylindrical section that provides said open top end.

25. The method as defined in claim 22, wherein said step of reducing said open top end includes reducing said open top end such that the diameter of said reduced open top end is less than or equal to the minimum cross-sectional width of said prismatic section.

26. The method as defined in claim 22, wherein said step of disposing said cathode into said prismatic section further includes forming a cavity centrally therein and disposing said cathode such that said cathode consumes a substantial volume of said prismatic section between said cavity and inner walls of said can, wherein said anode and separator are disposed within said cavity.

27. An electrochemical cell comprising:
a container having a prismatic section with a closed bottom end and a round open top end, said container initially having a circular open top end with a diameter greater than or equal to the maximum inside cross-sectional width of said prismatic section;
a first electrode disposed substantially within said prismatic section;
a second electrode disposed substantially within said prismatic section;
a separator disposed between said first and second electrodes; and
a round cover, wherein said open top end of said can is reduced in size to a reduced size round open end subsequent to the insertion of said first electrode so that said reduced round open end has a diameter that is less than or equal to the minimum cross-sectional width of said prismatic section, and said cover is assembled to said reduced round open end of said can.

28. The cell as defined in claim 27, wherein said first electrode has a cavity centrally formed therein into which said separator and said second electrode are disposed, said first electrode consuming a substantial volume between said cavity and inner walls of said prismatic section of said container.

29. The cell as defined in claim 28 wherein said first electrode comprises a cathode and said second electrode comprises an anode.

30. The cell as defined in claim 27 wherein said can initially includes a cylindrical section which provides said open top end.

31. The cell as defined in claim 27, wherein said container comprises a steel can.

* * * * *